(12) United States Patent
Murashima et al.

(10) Patent No.: US 7,038,725 B2
(45) Date of Patent: May 2, 2006

(54) CAMERA HAVING A SINGLE DISPLAY DEVICE FOR BOTH A VIEWFINDER DISPLAY AND A MONITOR DISPLAY

(75) Inventors: Nobuharu Murashima, Nara (JP); Akihiro Baba, Izumi (JP); Yoshiyuki Mizumo, Kaizuka (JP); Yoshito Konishi, Sakai (JP); Hisanori Itoh, Osaka (JP)

(73) Assignee: Minolta Co., Ltd., Osaka (JP)

( * ) Notice: Subject to any disclaimer, the term of this patent is extended or adjusted under 35 U.S.C. 154(b) by 43 days.

(21) Appl. No.: 10/461,383

(22) Filed: Jun. 16, 2003

(65) Prior Publication Data
US 2004/0169758 A1 Sep. 2, 2004

(30) Foreign Application Priority Data
Feb. 27, 2003 (JP) .............................. 2003-051462

(51) Int. Cl.
*H04N 5/222* (2006.01)
(52) U.S. Cl. .......................... 348/333.06; 348/333.02; 348/333.09
(58) Field of Classification Search ........... 348/333.01, 348/333.06, 333.08, 341; 396/373, 374
See application file for complete search history.

(56) References Cited

U.S. PATENT DOCUMENTS

| 6,477,329 B1 * | 11/2002 | Weng et al. ................. 396/287 |
| 6,549,237 B1 * | 4/2003 | Inuma et al. ........... 348/333.06 |
| 2001/0005232 A1 * | 6/2001 | Yoshioka et al. ............ 348/341 |

FOREIGN PATENT DOCUMENTS

| JP | 08-130665 | 5/1996 |
| JP | 09-18754 | 1/1997 |
| JP | 11-055552 | 2/1999 |
| JP | 11-265023 | 9/1999 |
| JP | 2000-224448 | 8/2000 |
| JP | 2001-169153 | 6/2001 |
| JP | P2001-268404 A | 9/2001 |

* cited by examiner

*Primary Examiner*—David Ometz
*Assistant Examiner*—Anthony J. Daniels
(74) *Attorney, Agent, or Firm*—McDermott Will & Emery LLP (57) ABSTRACT

A small-sized photographing apparatus in which a single display device performs both of a viewfinder and monitor display. The apparatus includes a body having a viewfinder window; the display device, the display surface of which can be observed from outside of the body; a pair of reflection mirrors inside the body; and a member for moving one of the reflection mirrors between a reflection position at which a beam of light from the display surface of the display device is reflected so that the beam is guided towards the viewfinder window, and a non-reflection position which is different from the reflection position.

17 Claims, 8 Drawing Sheets

Fig.1

PRIOR ART

CAMERA HAVING A SINGLE DISPLAY DEVICE FOR BOTH A VIEWFINDER DISPLAY AND A MONITOR DISPLAY

This application is based upon application No. 2003-51462, the contents of which are hereby incorporated by reference.

BACKGROUND OF THE INVENTION

1. Field of the Invention

The present invention generally relates to a camera, and particularly relates to the camera which can perform a viewfinder and monitor display.

2. Description of the Related Art

Conventionally, there have been proposed a video camera and a digital still camera, in which both of a viewfinder display and a monitor display can be performed or made.

Figure 1:
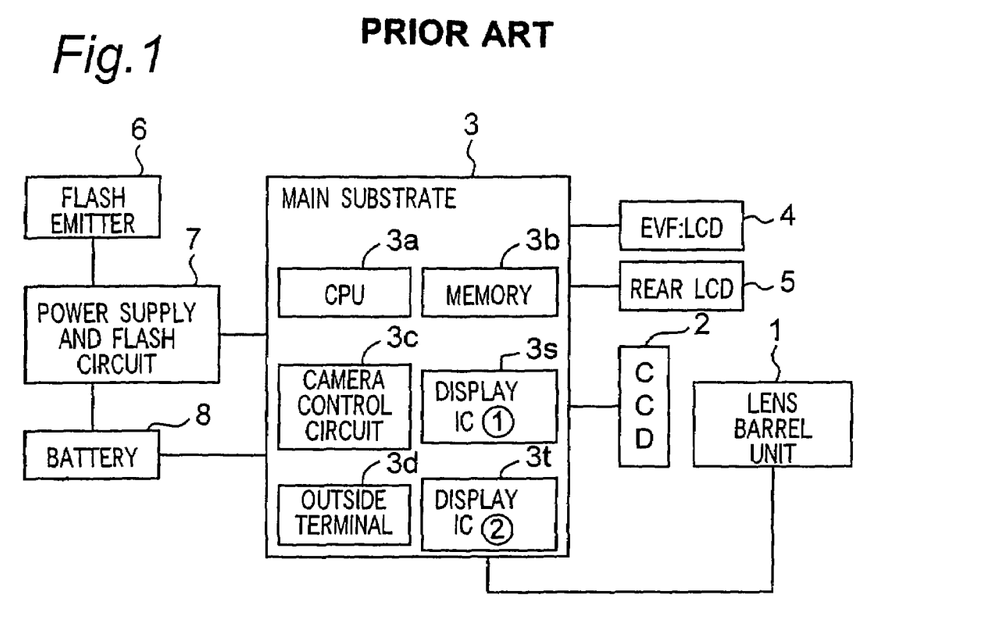
FIG. 1 is a block diagram showing a digital camera according to prior art.

FIG. 1 is a block diagram showing a general construction of a conventional digital still camera. As shown in the figure, a lens barrel unit 1, a CCD image taking element 2, an LCD (i.e. Liquid Crystal Display) 4 for an EVF (i.e. electronic viewfinder), an LCD 5 for a monitor on a rear side, a circuit 7, including both of an electric power supply circuit and a flash circuit, which is electrically connected to a flash emitter 6 and a battery 8, and the battery 8, are electrically connected to a main substrate (or main board) 3. The main substrate 3 has a CPU 3a, a memory 3b, a camera control circuit 3c, an external terminal (or an interface circuit) 3d, and a pair of IC 3s and 3t for electrically driving the pair of LCD units 4 and 5, respectively.

In a case of mounting such a pair of LCDs 4 and 5, and mounting such a pair of ICs 3s and 3t, the construction leads to a high cost of camera. Therefore, in order to prevent this high cost, it is possible to take into consideration that the display device for the monitor display is also employed as the display device for the viewfinder display.

For example, Japanese Laid-Open Patent Publication No. 11-265023, Japanese Laid-Open Patent Publication No. 8-130665, and Japanese Laid-Open Patent Publication No. 9-18754, disclose a type of camera and a type of viewfinder device, in which a display device rotates outside its housing. According to the construction thereof, when the display device opens relative to the housing thereof, the user can directly view the image plane (or picture plane) of the display device. On the other hand, when the display device closes relative thereto, the user can observe the image plane of the display device through its optical system provided inside the housing.

On the other hand, Japanese Laid-Open Patent Publication No. 2001-268404 discloses a type of camera in which a display device is fixed to the housing thereof. In the construction thereof, a prism has a semi-transmission optical surface, by which a flux of light (or luminous flux or beam of light) from the image plane of the display device is separated into two fluxes of light, one of which is for the monitor display and the other of which is for the viewfinder display.

According to the construction disclosed in each of Japanese Laid-Open Patent Publication No. 11-265023, Japanese Laid-Open Patent Publication No. 8-130665, and Japanese Laid-Open Patent Publication No. 9-18754, however, it is necessary to keep or set aside a particular space which is occupied only by the optical system. Therefore, with the construction, it is difficult to make the apparatus smaller or more compact.

Meanwhile, according to the construction disclosed in Japanese Laid-Open Patent Publication No. 2001-268404, the prism also occupies a predetermined space for itself. Therefore, with the construction, it is also difficult to make the camera smaller or more compact. In addition, because of the prism, the camera having the prism becomes heavier, and the manufacturing cost is higher. In addition, because of the semi-transmission optical surface, its luminance (or brightness) is lower.

SUMMARY OF THE INVENTION

Therefore, it is an object of the present invention to provide a compact camera in which both of the viewfinder display and the monitor display can be realized by a single display device.

In accomplishing this and other objects of the present invention, according to one aspect thereof, there is provided a camera comprising: a camera body having a viewfinder window; a display device having an image plane which can be observed from outside of the camera body; at least one reflection mirror which is provided inside the camera body; and a reflection mirror movement member which moves the at least one reflection mirror between a reflection position at which the at least one reflection mirror reflects a beam of light from the image plane towards the viewfinder window and a non-reflection position which is different from the reflection position.

In the mechanism, when the reflection mirror is at the reflection position, the viewfinder display is made or performed. Namely, in this state, the image plane (or picture plane) on the display device can be observed through the viewfinder window. The camera can be constructed such that the monitor display is made in at least one of the reflection position and the non-reflection position, and such that the image plane of the display device is directly seen or observed by the user in the state of the monitor display.

According to the mechanism, both of the viewfinder display and the monitor display can be realized by the single display device.

In addition, according to the mechanism, the at least one reflection mirror is moved inside the camera body, thereby possible to make full use of a space inside the camera body. Therefore, with the mechanism, it is possible to make the camera compact and small-sized.

That is, with the mechanism, a compact camera in which both of the viewfinder display and the monitor display can be made or performed by a single display device, is realized.

Furthermore, according to the mechanism, there is no need of employing a heavy and costly prism, and/or there is no need of employing a semi-transmissive surface which may cause a reduction in brightness.

In the mechanism, there can be provided a display device movement member for moving the display device relative to the camera body.

According to the mechanism, not only the at least one reflection mirror, but also the display device, can be moved. That is, with the mechanism, the space inside the camera body can be used more efficiently, and the camera can be made more compact and small-sized.

Alternatively, the display device can be fixed relative to the camera body.

According to the mechanism, it is possible to make both of the viewfinder display and the monitor display, by moving the at least one reflection mirror only.

In a case that the display device movement member is provided, preferably, the camera body has a monitor display window, wherein the display device can be moved by the display device movement member between a first position at which the display device is adjacent to the monitor display window and a second position at which the display device is retreated inside the camera body relative to the first position, and wherein the image plane of the display device opposes the monitor display window when the display device is positioned within at least a section of a total section between the first position and the second position.

According to the mechanism, the monitor display can be made, not only when the display device locates at the first position, but also when the display device is positioned within the at least a section of the total section between the first position and the second position. More specifically, when the display device is retreated inside the camera body so as to be within the at least a section of the total section between the first position and the second position, the image plane (or picture plane) of the display device is prevented from being exposed to outside light by the camera body itself. Therefore, with the mechanism, the image plane thereof can be seen or observed easily. Also, in a case that the display device moves inside the camera body while the angle forming between the display device and the camera body changes, it is possible to set, or adjust, the angle therebetween so that the image plane of the display device becomes easily visible to the user, by stopping the display device at a desirable angle.

Preferably, the camera body has a monitor display window, wherein the at least one reflection mirror is adjacent to the monitor display window at the reflection position.

According to the mechanism, when the display is the viewfinder display, the at least one reflection mirror covers the monitor display window. Namely, with the mechanism, there is no need of any additional member for covering the monitor display window. Therefore, with the mechanism, the overall construction of the camera is easily simplified, and it is possible to make the camera body compact and small-sized.

Preferably, the camera body has a monitor display window, wherein one of the at least one reflection mirror and a support member for supporting the at least one reflection mirror has an indication which is on a plane opposing the monitor display window and which is visible through the monitor display window, when the at least one reflection mirror is moved to the reflection position.

In the mechanism, the indication can be a character, figure, design, and so on. With the indication, the user can know that the viewfinder display is performed and that the monitor display is not performed.

In a case that there is provided a display device movement member for moving the display device relative to the camera body, there can be provided an actuator for driving the reflection mirror movement member and the display device movement member; and a controller for actuating the actuator on a basis of an instruction signal so that a position of the at least one reflection mirror is switched between the reflection position and the non-reflection position.

With the mechanism, it is possible to switch over the display between the viewfinder display and the monitor display, automatically.

In the mechanism, preferably, there is provided an operation part which has an operation member, wherein the operation part outputs the instruction signal to the controller on a basis of operation of the operation member.

With the mechanism, it is possible to switch over the display between the viewfinder display and the monitor display, by employing the operation member.

In the mechanism, preferably, there is provided a detector for detecting whether any object is presently adjacent to the viewfinder window and for outputting the instruction signal to the controller on a basis of a result of its detection, wherein the controller controls the actuator so as to move the at least one reflection mirror to the reflection position, when the detector detects that the any object is presently adjacent to the viewfinder window.

With the mechanism, when the detector detects that the any object is presently adjacent to the viewfinder window, the display is automatically changed over into the viewfinder display.

In the mechanism, an angular difference between an angle at which the at least one reflection mirror is positioned at the reflection position and an angle at which the at least one reflection mirror is positioned at the non-reflection position, can be between 30° and 60°.

In a case that the range is less than 30°, the image magnification may become too large, or the optical path length may not be absorbed inside the camera body when the image magnification is suitable, thus leading to a construction in which the viewfinder window is projected. Meanwhile, in a case that the range is greater than 60°, the optical path length may be too great, thus leading to the image magnification being too small. Meanwhile, in a case that the angle is approximately 45° (generally, between 40° to 50°), the arrangement of the optical path or the arrangement of the viewfinder window, and the image magnification, can be determined with a good balance.

In a case that the display device is fixed relative to the camera body, preferably, the camera can be constructed as follows.

Namely, there can be provided an actuator for driving the reflection mirror movement member, and a controller for actuating the actuator in compliance with instruction signal(s), so that the position of the at least one reflection mirror is changed over between the reflection position and the non-reflection position. With the mechanism, the changeover between the viewfinder display and the monitor display is performed automatically.

In the above mechanism, there can be further provided an operation part having an operation member, in which the operation part outputs the instruction signal to the controller in compliance with the operation of the operation member. With the mechanism, the display can be changed over between the viewfinder display and the monitor display by the operation member.

In the mechanism, preferably, there is provided a detector for detecting whether a user's eye is accessed to the viewfinder window and for outputting the instruction signal to the controller on a basis of a result of its detection, wherein the controller controls the actuator so as to move the at least one reflection mirror to the reflection position, when the detector detects that the user's eye is accessed to the viewfinder window.

With the mechanism, when the detector detects that the user's eye is accessed to the viewfinder window, the display is automatically changed over into the viewfinder display.

As a modification, the at least one reflection mirror can be a half mirror.

According to the mechanism, the image plane of the display device can be seen or observed through the surface of the semi-transmission (or half-transmission). At the same time, it is also possible to see or observe the image plane due to the reflection of the surface of the semi-transmission from the viewfinder window. Namely, with the mechanism, both of the viewfinder display and the monitor display can be made simultaneously.

In a case that the camera body has a monitor display window, wherein the display device can be moved by the display device movement member between a first position at which the display device is adjacent to the monitor display window and a second position at which the display device is retreated inside the camera body relative to the first position, and wherein the image plane of the display device opposes the monitor display window when the display device is positioned within at least a section of a total section between the first position and the second position, preferably, there is provided an operation member, wherein the display device is positioned within the at least a section of the total section therebetween in compliance with operation of the operation member.

According to the mechanism, it is possible to set, or adjust, the position and/or angle of the display device by employing the operation member, and it is possible to use it as an angle monitor.

Preferably, there is provided a transparent member for covering the monitor display window.

According to the mechanism, the display device moves inside the transparent member. Because the display device, as a moving part, is not exposed outside, the handling of the camera becomes easier.

In the mechanism, there can be provided a photometric measurer for measuring brightness of a surrounding, wherein position of the display device is switched between the first position and the second position in compliance with the brightness thus having been measured by the photometric measurer.

In the mechanism, the camera can be constructed so that the display device is retreated inside the camera body when the surrounding is bright for example. With this mechanism, the user can easily see or observe the image plane of the display device.

In the mechanism, the display device can be of a type of reflection, wherein there is further provided an illuminator inside the camera body, in which the illuminator illuminates the image plane of the display device when the at least one reflection mirror is at the reflection position.

According to the mechanism, the image plane of the display device can be easily seen or observed upon the viewfinder display.

Alternatively, the display device can have backlight and can be of a type of transmission, wherein the backlight changes brightness, when the at least one reflection mirror moves between the reflection position and the non-reflection position.

According to the mechanism, depending upon the viewfinder display and the monitor display, the necessary brightness of the backlight is changed. Therefore, with the mechanism, the electricity consumed by the camera is saved effectively.

In the mechanism, preferably, the brightness of the backlight is relatively low when the at least one reflection mirror is at the reflection position, and the brightness of the backlight is relatively high when the at least one reflection mirror is at the non-reflection position That is, generally, the viewfinder display is less affected by the surrounding light. Meanwhile, the monitor display is greatly affected by the surrounding light. Therefore, with the above mechanism, the image plane of the display device can be clearly seen or observed by the user.

Preferably, when the at least one reflection mirror is moved to the non-reflection position, one of the at least one reflection mirror and a support member for supporting the at least one reflection mirror blocks light which enters inside of the camera body from the viewfinder window.

That is, when the light entering inside the camera body from the viewfinder window reaches the image plane of the display device, its contrast is lowered, and the visibility of the monitor display is lowered. According to the mechanism, however, the light entering inside the camera body from the viewfinder window does not reach the image plane of the display device at the non-reflection position. Therefore, with the mechanism, the reduction of the visibility of the monitor display is effectively prevented.

In the mechanism, for example, the image plane of the display device can tilt relative to an optical axis connecting the image plane and the viewfinder window to each other, wherein the reflection mirror includes a bent mirror, which has a shape bent in one direction only.

That is, regarding the reflection surface of such a bent mirror, the shape and/or the size of the cross section which is perpendicular to the central axis of its bent surface thereof is/are the same no matter where the location is. In a case that the image plane of the display device is not perpendicular to the optical axis, an image on the image plane is compressed in one direction only, and the horizontal and vertical ratio changes. By employing such a bent mirror, the horizontal and vertical ratio can be returned to its original ratio.

The reflection surface of the bent mirror can be a convex surface for enlarging the image which has been compressed in one direction only. Alternatively, the reflection surface of the bent mirror can be a concave surface for compressing an image in a direction in which the image is not compressed, in order to compress the image uniformly or evenly.

In the mechanism, for example, the position of the bent mirror can be changed. For example, the central axis of the bent surface can be arranged so that it is perpendicular to a plane including a normal line of the image plane and the optical axis.

In accomplishing the above objects, according to another aspect of the present invention, there is provided a camera comprising: a reflection member which is movable between a first position and a second position; a display member which is movable between a first position and a second position; a control member which controls a position of each of the reflection member and the display member, and which switches a display mode between a first display mode and a second display mode.

BRIEF DESCRIPTION OF THE DRAWINGS

This and other objects and features of the present invention will become clear from the following description taken in conjunction with preferred embodiments thereof with reference to the accompanying drawings.

DETAILED DESCRIPTION OF THE PREFERRED EMBODIMENTS

Before a description of preferred embodiments of the present invention proceeds, it is to be noted that like or corresponding parts are designated by like reference numerals throughout the accompanying drawings.

With reference to FIGS. 2 through 15, the description is made below upon a digital camera (hereinafter, also simply referred to as "camera") according to each of the preferred embodiments.

First, referring to FIGS. 2 through 11, it is explained about the camera 10 according to a first embodiment.

Figure 2:
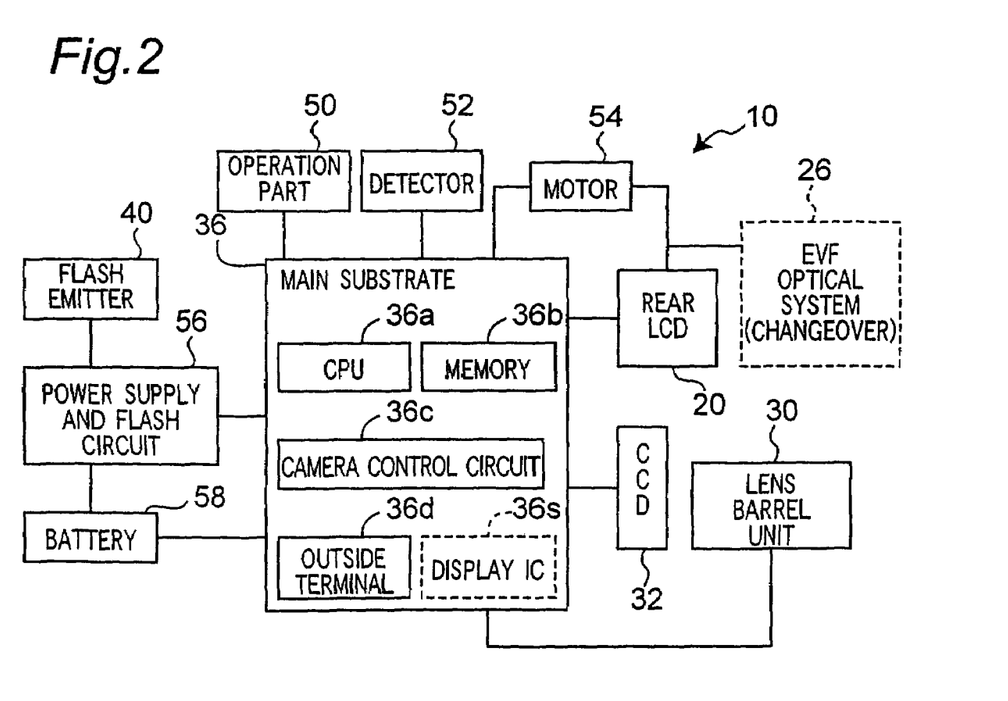
FIG. 2 is a block diagram showing a digital camera according to a first embodiment of the present invention.

As shown in FIG. 2, the camera 10 of the first embodiment has a main substrate (or main board) 36, an operation part 50, a detector 52, a motor 54, an LCD unit 20 as a display device, a CCD image taking element 32, a lens barrel unit 30, a battery 58, and a power supply and flash circuit 56 including an electric power supply circuit and a flash circuit, all of which are electrically connected to the main substrate 36.

More specifically, the operation part 50 has an operation member, and the operation part 50 outputs a signal in compliance with the operation thereof. The detector 52 includes a detection sensor for detecting a rotational position of an LCD unit 20 and for detecting a rotational position of a drive arm 44 which is explained later. The detector 52 detects a timing of a viewfinder display and a monitor display, and so on. The battery 58 and a flash emitter 40 are connected to the power supply and flash circuit 56. A CPU 36a for totally controlling an operation of the camera 10, a memory 36b for temporarily storing data, a camera control circuit 36c for controlling a focussing operation, an operation for exposure, a zooming/focussing drive of the lens barrel unit 30, an interface circuit 36d, including an external terminal, for sending and receiving data with respect to an external device such as a personal computer and with respect to a recording medium such as a CF card, a display IC 36s for electrically driving the LCD unit 20, and the like, are mounted on the main substrate 36.

The LCD unit 20 is a unit for the LCD (Liquid Crystal Display), and it has a transmissive liquid crystal display panel and a back light for illuminating the display panel from behind. The LCD unit 20 performs, or makes, a monitor display; namely, any image taken or captured by the camera is displayed on its monitor. Also, the LCD unit 20 is driven to move inside the camera body 12 by the motor 54. Combined with an optical system of an EVF (i.e. Electronic View Finder), the LCD unit 20 also performs, or makes, a viewfinder display; namely, any image taken or captured by the camera is displayed on its viewfinder.

Figure 4:
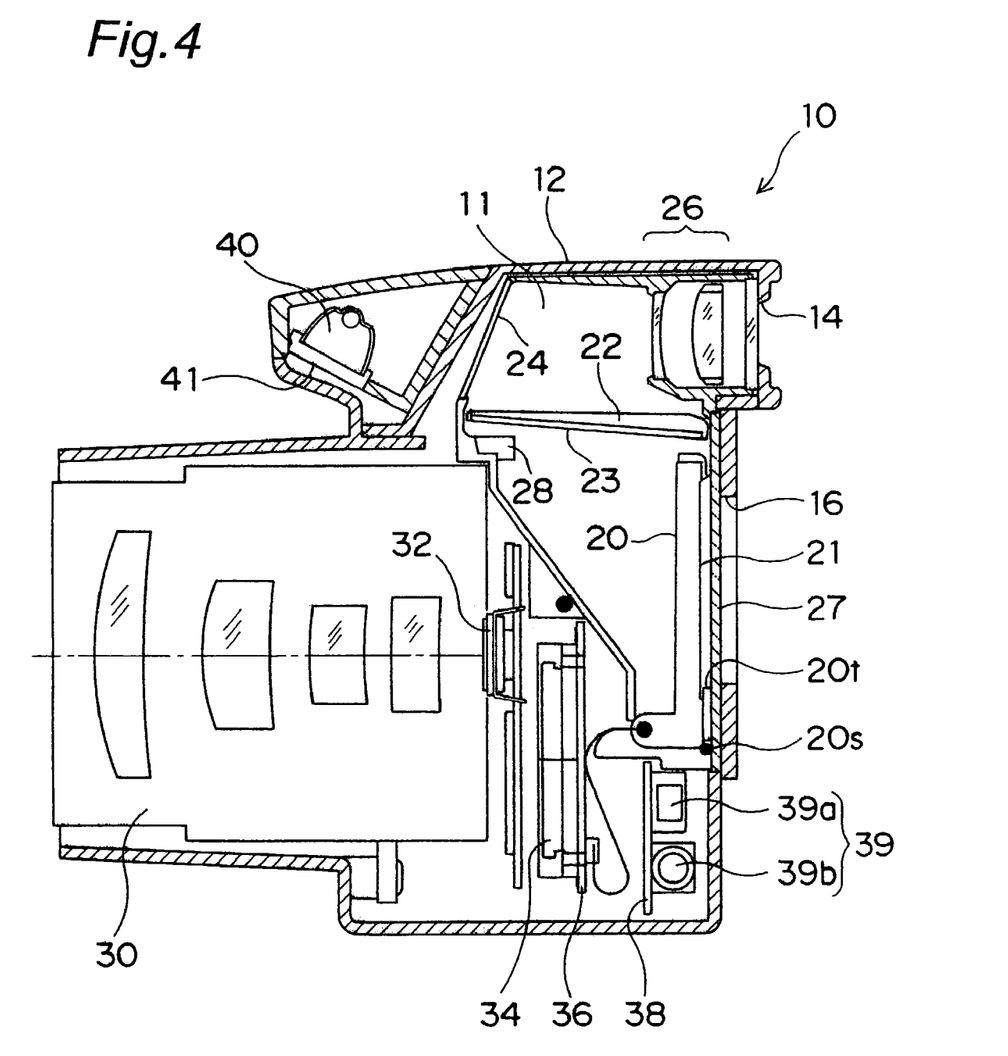
FIG. 4 is a cross-sectional view of the digital camera of FIG. 2, showing a state of its monitor display.
Figure 5:
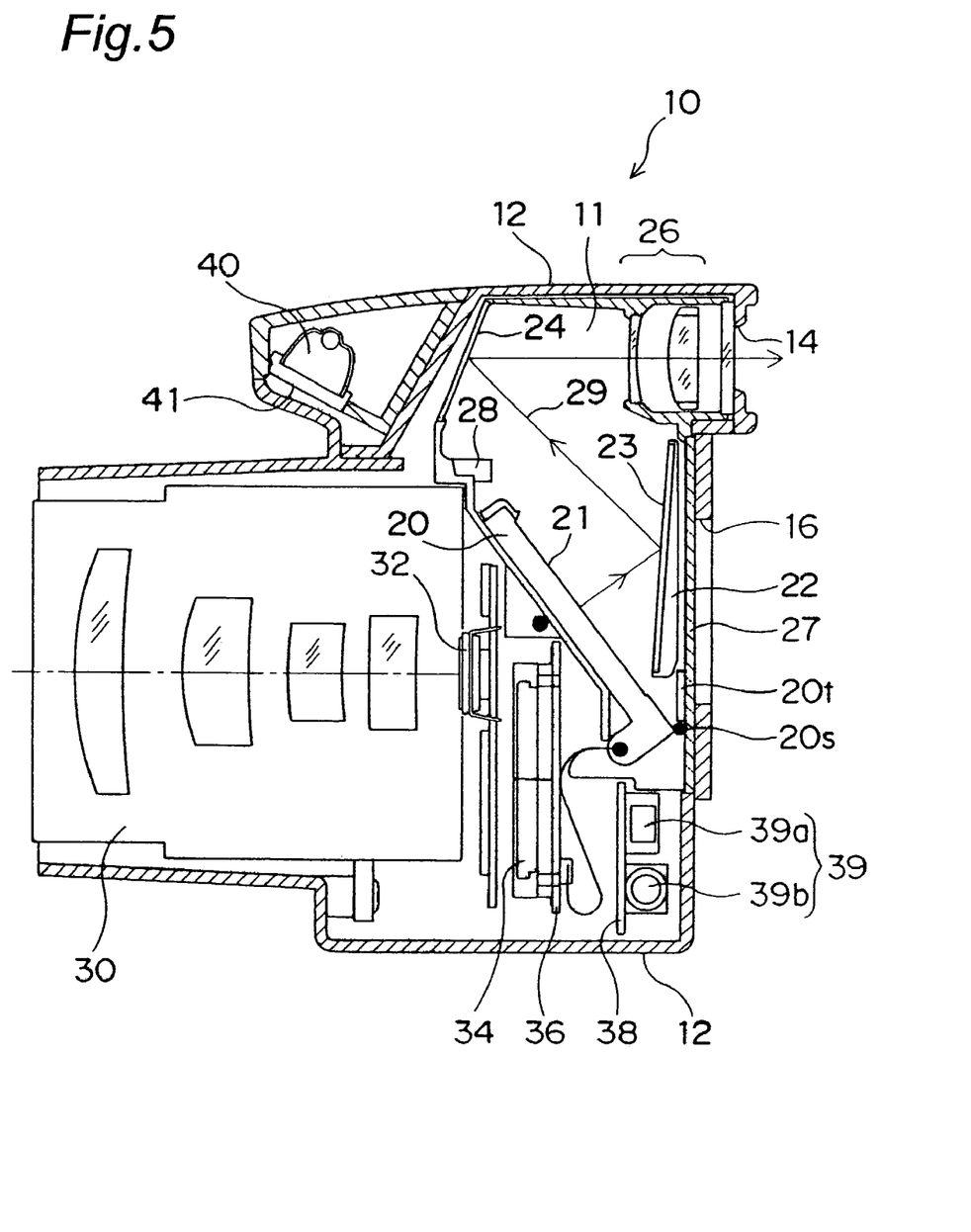
FIG. 5 is a cross-sectional view of the digital camera of FIG. 2, showing a state of its viewfinder display.

As explained in detail later, when the monitor display is performed, the LCD unit 20 is positioned close to a rear side (or rear surface) of a monitor display window 16 of the camera body 12, as shown in FIG. 4; and the image plane 21 thereof can be observed from a location backward away from the camera 10. On the other hand, when the viewfinder display is performed, the LCD unit 20 is positioned inside the camera body 12 with a state in which the LCD unit 20 tilts or slants, as shown in FIG. 5; and the image can be seen or observed through the viewfinder window 14. The EVF optical system (see FIG. 2) is constituted by a pair of reflection mirrors 23 and 24, and a lens group 26.

As a modification to the embodiment, instead of employing the transmissive liquid crystal display panel, it is possible to employ a reflective liquid crystal display panel. In this modification, an illumination device, such as an illumination lamp or a light emitting diode, can be mounted at a predetermined location inside the camera body 12, and the reflective liquid crystal display panel is illuminated when the monitor display is executed.

As its display device, as a modification to the embodiment, instead of employing the LCD, another type can be employed such as an EL (Electro-Luminescence).

Figure 3:
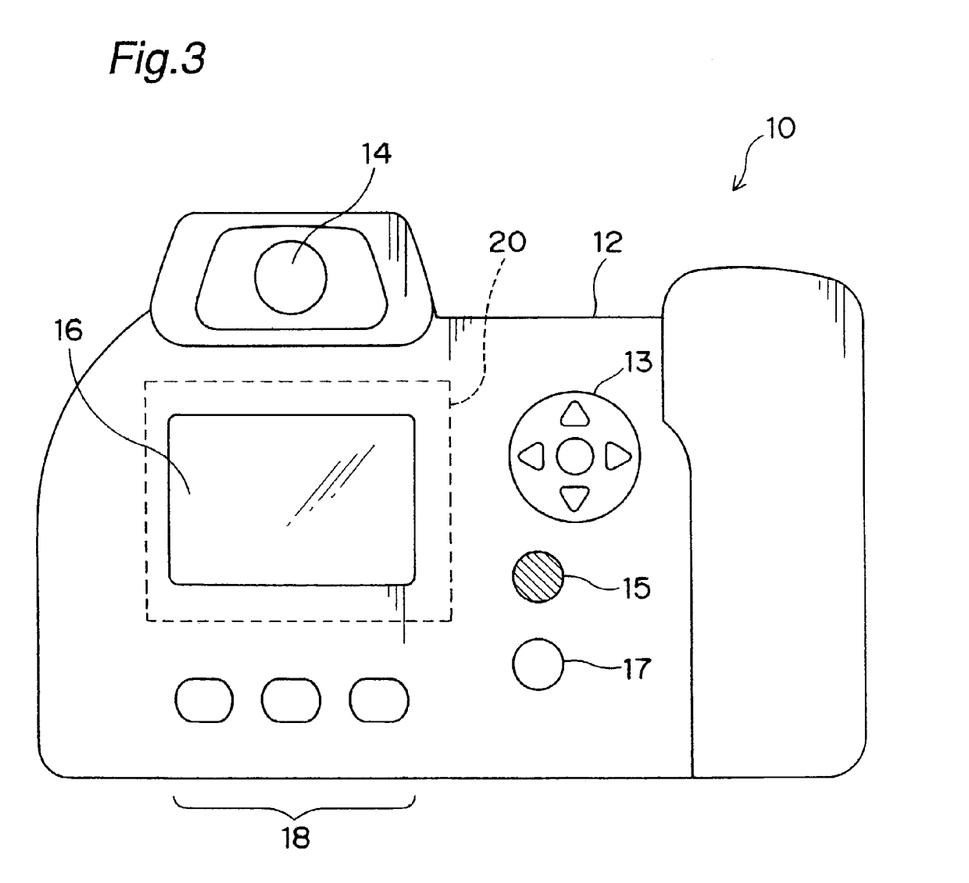
FIG. 3 is a view showing a back side (or rear side) of the digital camera of FIG. 2.

FIG. 3 shows a rear side of the camera 10. As shown in the figure, the viewfinder window 14 is arranged on top of the camera body 12; and the monitor display window 16 is arranged generally centrally in a direction of up and down of the camera body 12. Also, as shown therein, on the rear side of the camera body 12, there are arranged a cross-shaped button 13 in which a plurality of buttons are arranged in a shape of a cross, a display changeover button 15 for switching a display between the viewfinder display and the monitor display, an operation button 17, and a switch button group 18. These buttons 13, 15, 17 and 18 are included in the aforementioned operation part 50 (see FIG. 2).

Each of FIGS. 4 and 5 shows an internal construction, or mechanism, inside the camera body 12. As shown in the figure, the lens barrel unit 30 is arranged on a front and generally central part of the camera body 12; and a flash emitter 40 is arranged on an upper part thereof. The flash emitter 40 is of a movable pop-up type. The flash emitter 40 can move upwards, and the flash window 41 can be exposed outside, when the flash emitter 40 emits the flash light.

Inside the lens barrel unit 30, there is arranged the CCD image taking element 32 which is close to a location at which any image taken by the image taking optical system (or photographing optical system) is focussed or formed. Behind the CCD image taking element 32 (i.e. on the right side of the CCD image taking element 32 in each of FIGS. 4 and 5), there are arranged a card chamber 34 for housing a memory card (a CF card, for example) which stores image data, the main substrate 36, an operation substrate (or operation board) 38, a digital output terminal 39a, and a DC power supply terminal 39a.

On the upper part of the camera body 12, there is arranged a viewfinder unit 11 for executing the monitor display and the viewfinder display. The viewfinder unit 11 is provided as a unit; therefore, it is easy to build the viewfinder unit 11 in the camera body 12. The viewfinder unit 11 has a transparent rear plate 27 which opposes a rear housing of the camera body 12, as shown in the figure.

FIG. 4 shows the camera 10 in a state of the monitor display. The LCD unit 20 is in a first position where the image plane 21 thereof is adjacent to the rear plate 27, and the image plane 21 can be observed from a location backward away from the camera body 12 through the monitor window 16.

In this state, a mirror unit 22 supporting the reflection mirror 23 extends generally horizontally, and the reflection mirror 23 locates at a non-reflection position. In a case that a beam of light entering the inside of the camera body 12 through the viewfinder window 14 reaches the image plane 21, its contrast on the image plane 21 becomes lower and it becomes difficult for the user to recognize the image on the image plane 21 clearly. According to the embodiment, the mirror unit 22 in the state of the monitor display is positioned horizontally as aforementioned, the beam of light entering inside of the camera body 12 through the viewfinder window 14 is blocked by the mirror unit 22. Therefore, with the mechanism, it is possible to prevent the degradation of clearness of the image forming on the image plane 21.

On the other hand, FIG. 5 shows the camera 10 in a state of the viewfinder display. In the state, the LCD unit 20 is in a second position where the LCD unit 20 is tilted forwards inside the camera body 12. At the same time, the mirror unit 22 is positioned near the rear plate 27, and the reflection mirror 23 is in a reflection position where the reflection mirror 23 opposes the image plane 21 of the LCD unit 20.

As shown in FIG. 5, the optical axis 29 of the viewfinder optical system, is bent by the pair of reflection mirrors 23 and 24, and the bent beam of light along the bent optical axis is guided towards the lens group 26 (which includes an eyepiece lens or ocular lens) locating near the viewfinder window 14. With the mechanism, the image plane (or display surface) 21 of the LCD unit 20 can be observed through the viewfinder window 14.

By tilting the LCD unit 20 within a predetermined range (30° to 60°, preferably at 45° approximately), the camera 10 can be constructed with a good balance. More specifically, for example, in a case that the inclination of the LCD unit 20 relative to a vertical direction is less than 30° (i.e. in a case that the LCD unit 20 is nearly vertical in inclination), there is need of projecting the viewfinder window 14 rearwards in order to secure a predetermined optical path length for gaining a suitable image magnification. To the contrary, in a case that the inclination of the LCD unit 20 relative to the vertical direction is greater than 60° (i.e. in a case that the LCD unit 20 is nearly horizontal in inclination), the optical path length therefor becomes too great (i.e. the image magnification becomes too small) in a state in which the viewfinder window 14 is provided on the upper part of the camera body 12. On the other hand, in a case that the inclination of the LCD unit 20 relative to the vertical direction is approximately 45° (40° to 50°), the camera with a best balance in construction can be realized.

Upon the viewfinder display, the mirror unit 22 covers most of the viewfinder display window 16. On the mirror unit 22, there are arranged some patterns (figures, character(s), design(s), etc.) as an indication or a designation, within a region within which the user can observe or see it from the viewfinder display window 16. On the basis of such an indication or a designation, whether the camera 10 is in the state of the viewfinder display, or not in the state of the monitor display, is shown or informed.

Part of the viewfinder display window 16 which is not covered nor shielded by the mirror unit 22, is covered or shielded by a light shielding member 20t mounted on the LCD unit 20. The light shielding member 20t is rotatably supported about a supporting axis 20s, the relative position to the LCD unit 20 being fixed. The light shielding member 20t is biased towards the rear side (i.e. in a clockwise direction in each of FIGS. 4 and 5) of the camera body 12 by a spring member. When the display is the monitor display as shown in FIG. 4, the supporting axis 20s is downwards with the rotation of the LCD unit 20. Therefore, the light shielding member 20t is under the monitor display window 16, thus the light shielding member 20t being invisible from outside.

With reference to FIGS. 6 to 11, it is explained about the viewfinder unit 11 more in detail.

Namely, an area, or region, shown by a reference numeral 27w in each of FIGS. 6 to 11, is the area in which the rear plate 27 overlaps an opening of the viewfinder display window 16.

Figure 6:
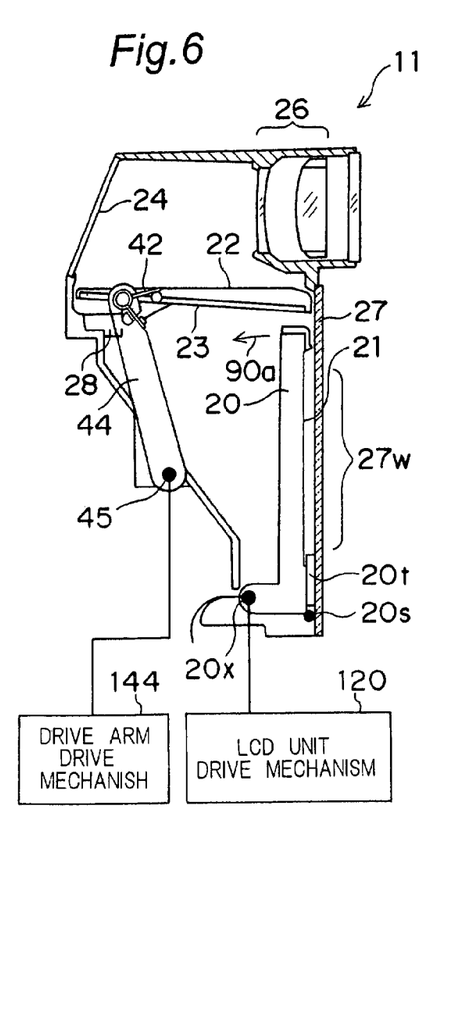
FIG. 6 is an explanatory view showing how an LCD of the digital camera of FIG. 2 operates.
Figure 7:
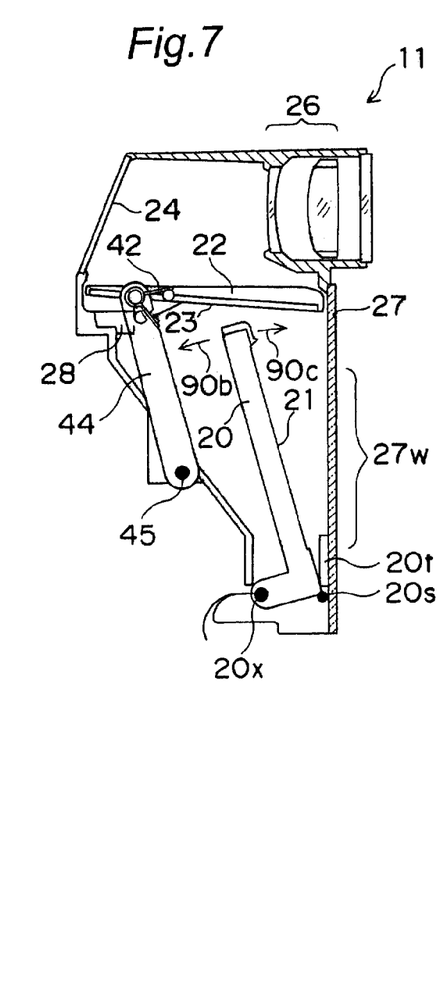
FIG. 7 is an explanatory view showing how the LCD of the digital camera of FIG. 2 operates.
Figure 8:
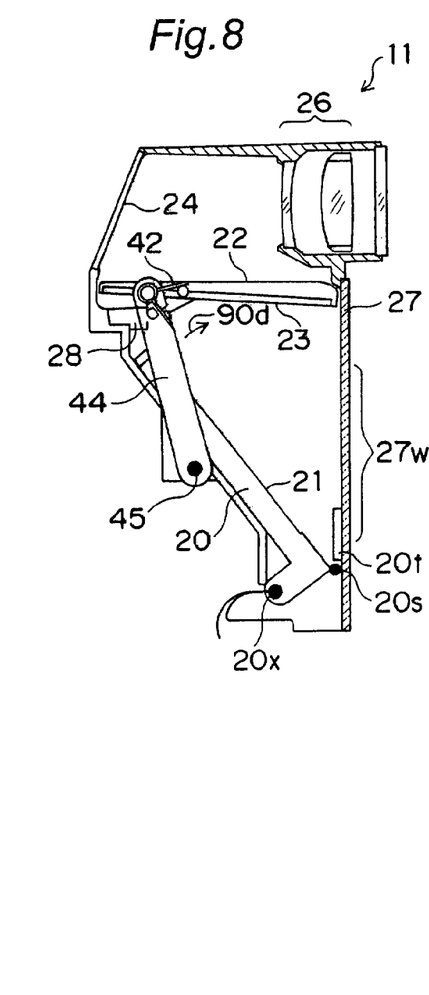
FIG. 8 is an explanatory view showing how the LCD of the digital camera of FIG. 2 operates.

As shown in FIGS. 6 to 8, the LCD unit 20 rotates about a central axis 20x. The rotation of the motor 54 (see FIG. 2) is selectively transmitted to the central axis 20x via an LCD unit drive mechanism 120 (see FIG. 6) including a cam for example, and the angle (or inclination) of the LCD unit 20 is controlled thereby. The LCD unit 20 rotates about the central axis 20x between the first position as shown in FIG. 6 and the second position as shown in FIG. 8, as indicated by the arrows 90a through 90d. FIG. 6 shows a state of the monitor display of the viewfinder unit 11, corresponding to the state thereof shown in FIG. 4. The mirror unit 22 does not move while the LCD unit 20 moves.

Figure 9:
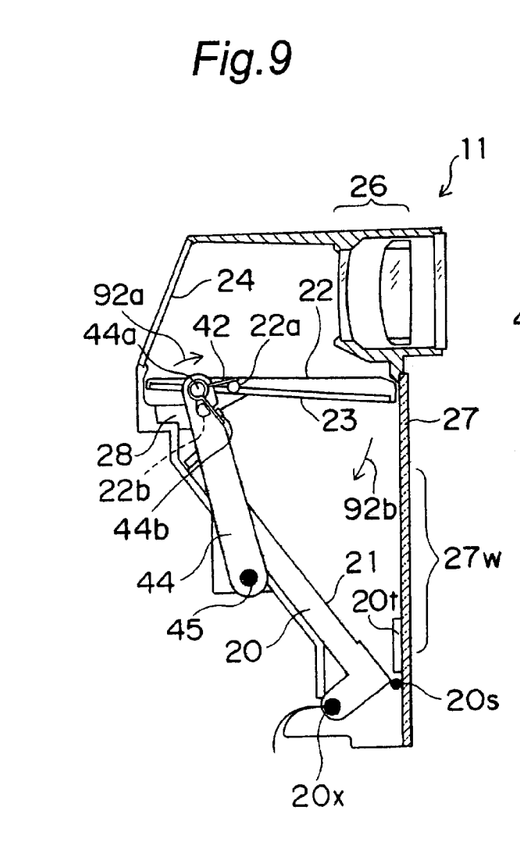
FIG. 9 is an explanatory view showing how a mirror unit of the digital camera of FIG. 2 operates.
Figure 10:
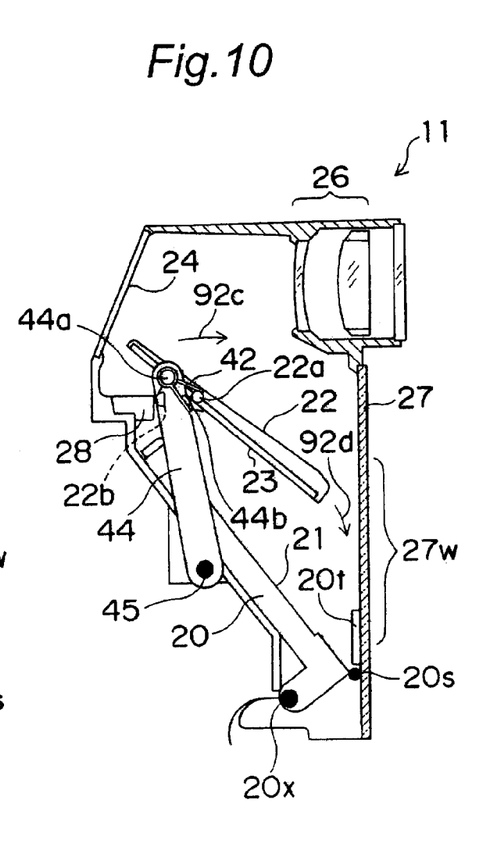
FIG. 10 is an explanatory view showing how the mirror unit of the digital camera of FIG. 2 operates.
Figure 11:
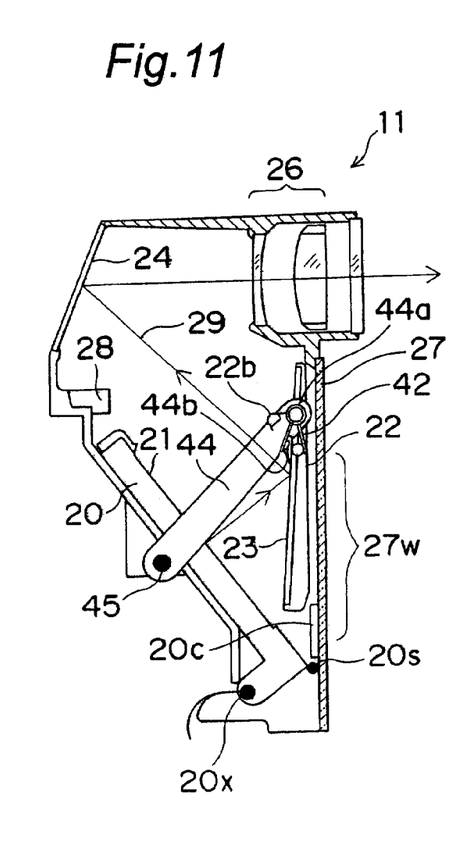
FIG. 11 is an explanatory view showing how the mirror unit of the digital camera of FIG. 2 operates.

As shown in FIG. 9 to 11, the mirror unit 22 moves while the LCD unit 20 stops at the second position.

The mirror unit 22 is rotatably supported about a supporting axis 44a which is provided on one end of a drive arm 44. The drive arm 44 is rotated about a supporting axis 45 which is connected to the viewfinder unit 11. The rotation of the motor 54 (see FIG. 2) is selectively transmitted to the supporting axis 45 via a drive arm drive mechanism 144 (see FIG. 6) including a cam for example, and the angle (or inclination) of the drive arm 44 is controlled thereby.

The mirror unit 22 and the drive arm 44 have engaging parts 22a and 44b, respectively, and engagement pieces of a torsion coiled spring mounted about the supporting axis 44a with a play engages with the engaging parts 22a and 44b, respectively. With the construction, the mirror unit 22 is biased by the torsion coiled spring so that the angle between the mirror unit 22 and the drive arm 44 becomes smaller (i.e. biased in a clockwise direction in FIGS. 9 to 11).

Furthermore, the mirror unit 22 has a contact part 22b. In a state (corresponding to the viewfinder display shown in FIG. 5) shown in FIG. 11, when the drive arm 44 rotates counterclockwise in the figure, the contact part 22b contacts a contact block 28 of the finder unit 11, as shown in FIG. 10. When the drive arm 44 rotates further counterclockwise against the biasing force of the torsion coil spring 42, the mirror unit 22 rotates counterclockwise about the supporting axis 44a in FIG. 10. Then, as shown in FIG. 9, the angle between the mirror unit 22 and the drive arm 44 becomes greater, and the mirror unit 22 becomes horizontal so that the reflection mirror 23 of the mirror unit 22 locates at the non-reflection position.

In the switchover between the monitor display and the viewfinder display, the space in which the LCD unit 20 moves and the space in which the mirror unit 22 moves, overlap each other, so that it is possible to make the camera 10 compact and small-sized.

Depending upon the monitor display and the viewfinder display, the brightness of the image plane 21 of the LCD unit 20 is automatically switched over. That is, when the monitor display is made, the influence by outside light is relatively great. Therefore, the brightness is switched into a high brightness. On the other hand, when the viewfinder display is made, the influence by outside light is relatively small. Therefore, the brightness is switched into a low brightness.

Next, it is explained about the changeover between the viewfinder display and the monitor display.

When the camera 10 is in the state of the monitor display, as shown in FIGS. 4 and 6, in which the LCD unit 20 is positioned along the rear surface of the camera body 12, and when the display changeover button 15 is operated, the CPU 36a of the main substrate 36 controls so as to start driving the motor 54, on the basis of the instruction signals outputted from the operation part 50. Due to the control, the LCD unit 20 and the drive arm 44 are driven by the motor 54 sequentially, via the LCD unit drive mechanism 120 and the drive arm drive mechanism 144.

That is, the LCD unit 20 is rotated about the central axis 20x from the first position shown in FIG. 6 to the second position shown in each of FIGS. 8 and 9.

Next, the drive arm 44 is rotated clockwise as shown by an arrow 92a in FIG. 9. While the contact part 22b of the mirror unit 22 contacts the contact block 28, the angle between the mirror unit 22 and the drive arm 44 is maximum. From this state, the mirror unit 22 is rotated clockwise about the supporting axis 44a, as shown by an arrow 92b in FIG. 9. Namely, when the contact part 22b is moved away from the contact block 28, the mirror unit 22 is rotated clockwise by the biasing force exerted by the torsion coil spring 42 as shown by the arrow 92a in FIG. 9, and the mirror unit 22 and the drive arm 44 are moved so as to be in a predetermined state as shown in FIG. 11. Then, as shown in the figure, the mirror unit 22 reaches the rear plate 27; the reflection mirror 23 of the mirror unit 22 is in the reflection position; and the camera 10 is in the state of the viewfinder display. Then, when a detecting sensor detects the state, the CPU 36a stops the rotation of the motor 54, on the basis of the signal(s) outputted from the detector 52.

Meanwhile, when the camera 10 is in the state of the viewfinder display, and when the display changeover button 15 is operated, then the motor 54 rotates in a reverse direction so that the aforementioned operation is performed in a reverse way.

That is, in the state shown in FIG. 11, the drive arm 44 is rotated counterclockwise, so that the reflection mirror 23 is returned to the non-reflection position (see FIG. 9). Next, the LDC unit 20 is rotated clockwise from the second position shown in FIG. 8 to the first position shown in FIG. 6, so that the camera 10 is in the state of the monitor display. When the detecting sensor detects the state, the CPU 36a stops the rotation of the motor 54 on the basis of the signal(s) outputted from the detector 52.

According to the embodiment, firstly, after one of the LCD unit 20 and the mirror unit 22 is moved or operated, the other thereof is moved or operated. As a modification to the embodiment, the LCD unit 20 and the mirror unit 22 can be moved or operated simultaneously, through a partial progression of the movement, or through a whole progression thereof.

Also, according to the embodiment, the switchover between the monitor display and the viewfinder display is made by reversing the rotation of the motor 54. As a modification to the embodiment, it is possible to make the switchover therebetween by rotation of the motor 54 in one rotational direction only. In this modification, it is possible to employ its reversed rotation thereof in order to carry out another movement or operation, such as a pop-up operation of the flash emitter 40, thus making the camera more compact and smaller in size.

When the camera 10 is in the state of the viewfinder display (see FIG. 5), the rear surface (i.e. surface opposite to the reflection mirror 23) of the mirror unit 22 can be observed or seen through the viewfinder display window 16. Therefore, by arranging or putting any proper indication, such as a logo mark and a designation to show that the viewfinder can be used, on the rear surface, it is possible to inform the user of the fact that the camera 10 is in the state of the viewfinder display, and of the fact that the reason why the monitor display is not executed is not due to the breakdown or malfunction of the monitor display.

Also, as a modification to the embodiment, instead of performing the monitor display only when the LCD unit 20 is positioned at the first position where the LCD unit 20 locates along the rear plate 27 as shown in FIG. 6, it is possible to perform the monitor display when the LCD unit 20 is positioned at an intermediate position as shown in FIG. 7, or when it is positioned at the second position as shown in FIG. 8, for example. Namely, it is possible to arbitrarily set or adjust the angle of the image plane 21 of the LCD unit 20 between the first position and the second position. With this arrangement, it is possible to use the camera as an angle monitor which allows the user to observe the monitor display from an upper slant position relative to the camera body, for example, thus expanding the freedom of its observation position. According to the mechanism, when the LCD unit 20 tilts, it moves towards inner part of the camera body. That is, the inclination of the LCD unit 20 has the function to block outside light. Therefore, with the mechanism, the image plane 21 of the LCD unit 20 can be easily observed by the user. In the modification, the operation, like movement or stop, of the LCD unit 20 can be executed by manipulating the cross-shaped button 13.

Also, as a modification to the embodiment, when the monitor display is selected, the image plane 21 of the LCD unit 20 can be automatically set so that the angle of the image plane 21 becomes a predetermined angle which the user has set beforehand.

Also, as a modification to the embodiment, it is possible to use the output from the CCD image taking element, for example, in order to detect the brightness of its surrounding. In the modification, depending upon the brightness thereof, the changeover of the angle of the LCD unit 20 upon the monitor display, the switchover between the monitor display and the viewfinder display, and the like, can be performed automatically. For example, when the surrounding is bright, the LCD unit 20 is tilted, so that the LCD unit 20 is moved inwardly inside the camera body. With the mechanism, the image can be observed or seen easily.

Figure 12:
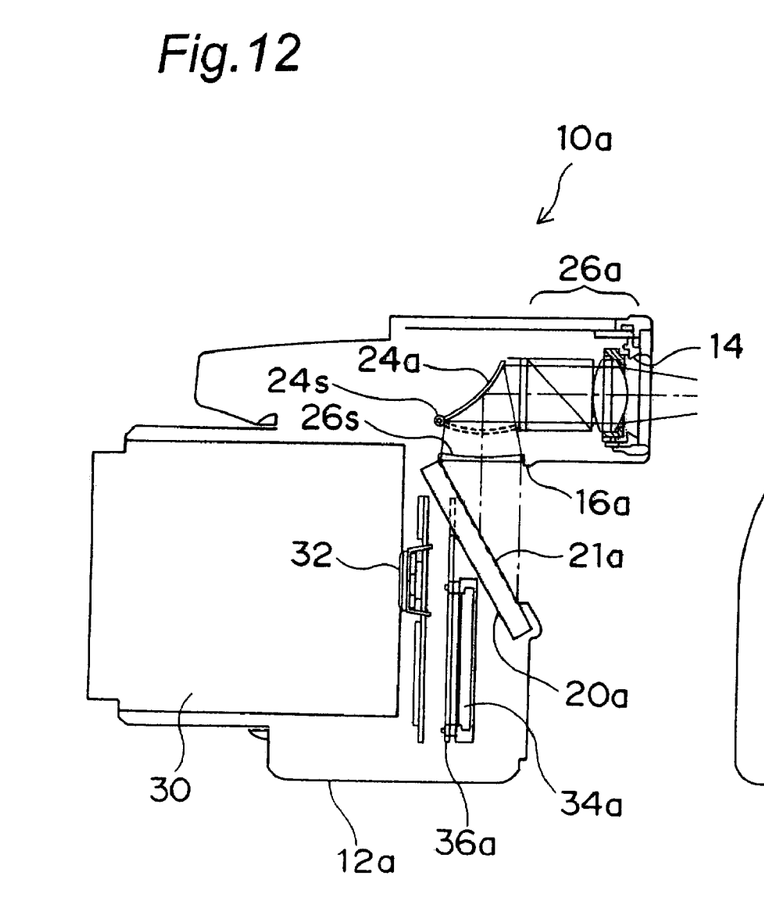
FIG. 12 is a view showing a construction of the digital camera according to a second embodiment of the present invention.
Figure 13:
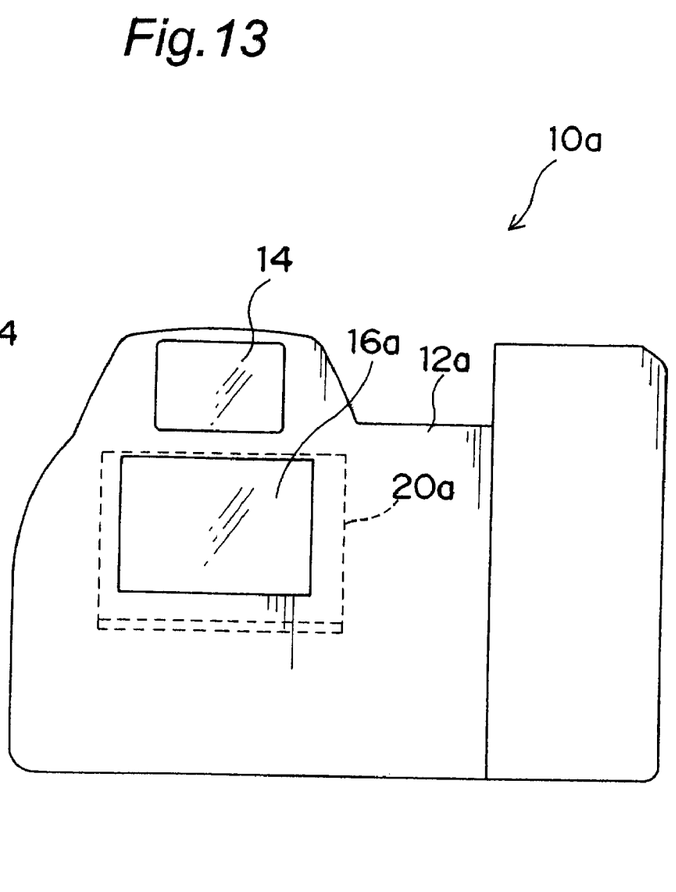
FIG. 13 is a view showing the construction of the digital camera of FIG. 12.

Next, referring to FIGS. 12 and 13, it is explained about the camera 10a according to a second embodiment.

The camera 10a of the second embodiment has a basic construction similar to that of the camera 10 of the first embodiment. In the description below, the same reference numeral is used to designate the same or similar constitutional part of the camera of the second embodiment in contrast with the constitutional part of the camera of the first embodiment. Focussing a main difference therebetween, a description is made below upon the camera 10a of the second embodiment.

As shown in FIG. 12, the LCD unit 20a is fixed inside the camera body 12a with a state in which the LCD unit 20a is tilted at a predetermined angle relative to the rear surface of the camera body 12a. Matching the tilt, or inclination, of the LCD unit 20a, the main substrate (or main board) 36a, the card chamber 34a, and so on, are mounted inside the camera body 12a. Above the LCD unit 20a, there is arranged a reflection mirror 24a, the cross section of which is convex. The reflection mirror 24a reflects a beam of light from the image plane 21a of the LCD unit 20a towards a lens group 26a of the viewfinder optical system.

According to the mechanism, the image plane 21a of the LCD unit 20a is positioned inwardly inside the camera body 12a. With the mechanism, outside light is effectively blocked or prevented. Therefore, the image can be easily seen or observed.

Relative to the viewfinder window 14, any image on the image plane 21a of the LCD unit 20a is seen slantingly. Namely, the image, compressed in one direction, is seen or observed by the user. In order to compensate, or correct, the compression of the image, the reflection mirror 24a is formed as a convex mirror, the mirror surface of which is convexed in one direction only. With the construction of the convex mirror 24a, the image is enlarged or expanded, only in the direction which corresponds to the direction in which the image is compressed, so that the horizontal to vertical ratio is restored to its original size. In the arrangement, in FIG. 12, the image plane 21a of the LCD unit 20a extends in a direction perpendicular to a direction in which the surface of the paper of this figure extends; and the cross section, of the reflection mirror 24a, parallel to the surface of the paper thereof, has the same configuration or shape, no matter where the location is.

As a modification to the embodiment, instead of employing the convex mirror, it is possible to use a concave mirror, the mirror surface of which is concave in one direction only. In the modification, any image is compressed only in a direction perpendicular to a direction in which the image is compressed, by the convex mirror, so that the horizontal to vertical ratio is restored to its original size.

According to the second embodiment, the reflection mirror 24a has a shape which is bent one-dimensionally. As a modification thereto, the reflection mirror can have a shape which is bent two-dimensionally so as to have a part of power (i.e. a part of lens function) in the viewfinder optical system. In this mechanism, it is possible to simplify the construction of the lens group 26a.

As shown in FIG. 12, the reflection mirror 24a rotates about an axis 24s between a reflection position shown by a solid line and a non-reflection position shown by a dot line.

At the non-reflection position, the reflection mirror 24a is positioned generally horizontally, so that the reflection mirror 24a gets across, or traverses, the light path of the viewfinder optical system. In the state, the beam of light coming through the viewfinder window 14 is blocked thereby. Namely, in the state, that any image on the image plane 21a of the LCD unit 20a is difficult to see or observe due to the light which enters inside through the viewfinder window 14, is effectively prevented.

As shown in FIG. 12, a concave lens 26s is mounted between the LCD unit 20a and the reflection mirror 24a. The concave lens 26s is an optical system for contracting, or shrinking, any displayed image. With the concave lens 26s, the light path length (or optical path length) becomes shortened in the viewfinder optical system, which in turn prevents the viewfinder window 14 from projecting rearwards too much.

Figure 14:
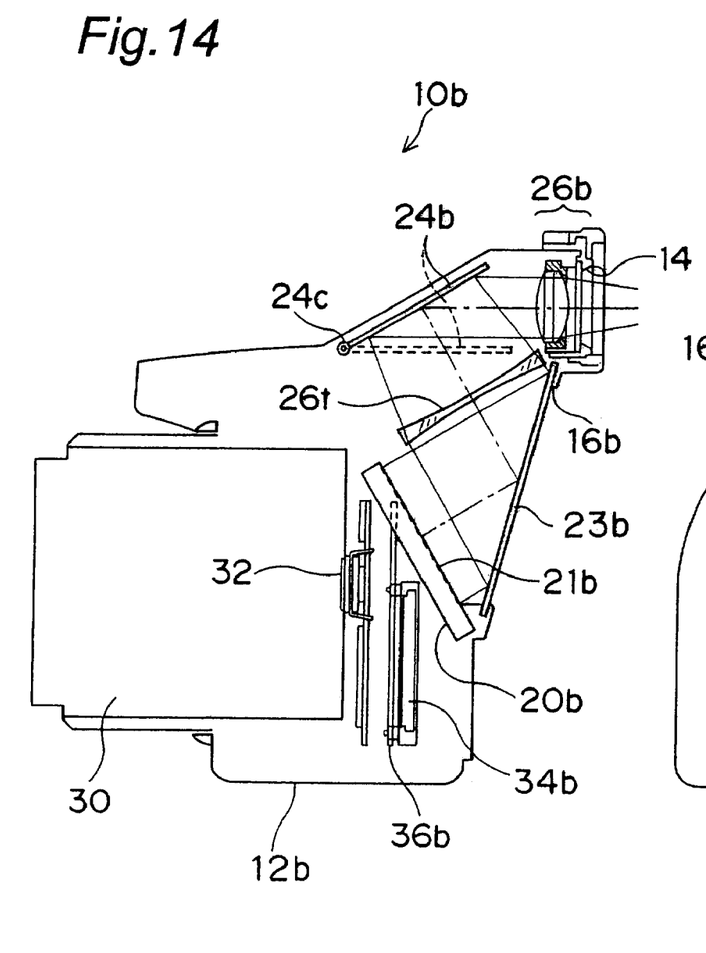
FIG. 14 is a view showing a construction of the digital camera according to a third embodiment of the present invention.
Figure 15:
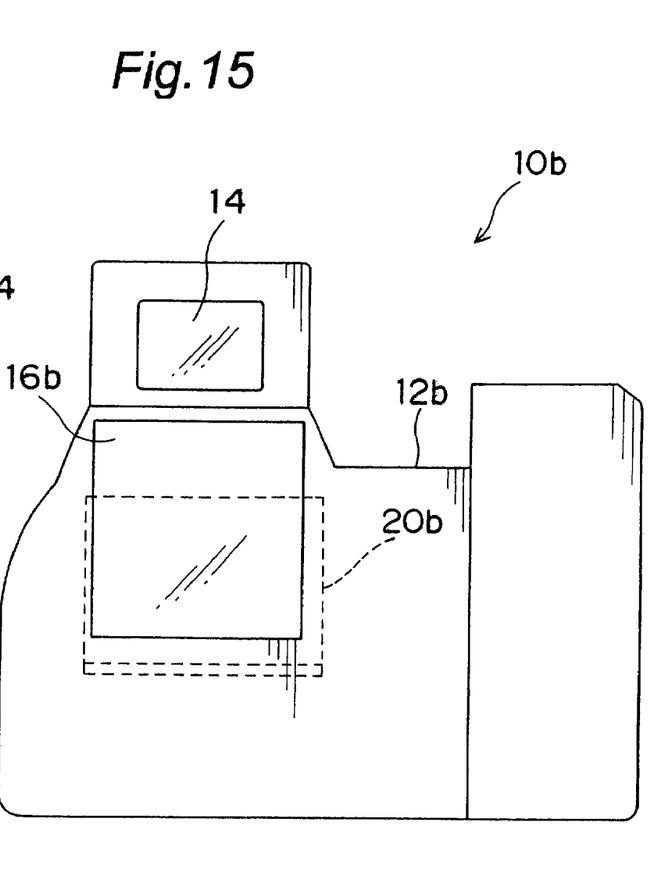
FIG. 15 is a view showing the construction of the digital camera of FIG. 14.

Next, referring to FIGS. 14 and 15, it is explained about the camera 10b according to a third embodiment. The camera 10b of the third embodiment has a basic construction similar to that of the camera 10 of the first embodiment. In the description below, the same reference numeral is used to designate the same or similar constitutional part of the camera of the third embodiment in contrast with the constitutional part of the camera of the first embodiment. Focussing a main difference therebetween, a description is made below upon the camera 10b of the third embodiment.

As shown in FIG. 14, the LCD unit 20b is fixed inside the camera body 12a with a state in which the LCD unit 20b is tilted at a predetermined angle relative to the rear surface of the camera body 12b. Matching the tilt, or inclination, of the LCD unit 20b, the main substrate (or main board) 36b, the card chamber 34b, and so on, are mounted inside the camera body 12b.

The monitor display window 16b on the rear side (or on rear surface) of the camera body 12b is formed slantingly relative to the camera body 12b, as shown in FIG. 14, and a first reflection mirror 23b is mounted inside the monitor display window 16b. In addition, a second reflection mirror 24b is mounted above the LCD unit 20b.

In the mechanism, a beam of light (or a flux of light) from the image plane 21b of the LCD unit 20b is reflected on the first reflection mirror 23b and on the second reflection mirror 24b, one after another, and the beam of light thus having been reflected thereon is guided to the lens group 26b which is arranged near the viewfinder window 14.

As shown in FIG. 14, a concave lens 26t is mounted between the first reflection mirror 23b and the second reflection mirror 24b. The concave lens 26t is an optical system for contracting, or shrinking, any displayed image. With the concave lens 26t, the light path length (or optical path length) becomes shortened in the viewfinder optical system, which in turn prevents the viewfinder window 14 from projecting rearwards too much.

The first reflection mirror 23b has a semi-transmissive surface. From the monitor display window 16b on the rear side of the camera body 12b, the user can always see or observe the image plane 21b of the LCD unit 20b which is mounted slantingly as aforementioned, through the semi-transmissive surface of the reflection mirror 23b.

As shown in FIG. 14, the reflection mirror 24b rotates about an axis 24c between a reflection position shown by a solid line and a non-reflection position shown by a dot line.

At the non-reflection position, the reflection mirror 24b is positioned generally horizontally, so that the reflection mirror 24b gets across, or traverses, the light path of the viewfinder optical system. In the state, the beam of light coming through the viewfinder window 14 is blocked thereby, and there is no viewfinder display. In the state, the monitor display, or the image plane 21b of the LCD unit 20b, can be easily seen or observed by the user, because the image plane 21b thereof is less affected by the outside light.

According to the camera 10, 10a, 10b of each of the aforementioned embodiments, the LCD unit 20, 20a, 20b and/or the reflection mirror 23, 24a, 24b is/are moved inside the camera body 12, 12a, 12b. With the mechanism, both of the viewfinder display and the monitor display are made by employing the single LCD unit 20, 20a, 20b, and by the single display IC 36s. Therefore, with the mechanism, the camera 10, 10a, 10b can be made compact, or can be downsized.

Although the present invention has been fully described in connection with the preferred embodiments thereof with reference to the accompanying drawings, it is to be noted that various other changes and modifications are also apparent to those skilled in the art.

For example, as a modification, the camera can have a detector for detecting whether the user's eye(s) is/are accessed to the viewfinder window 14, or not, in which instruction signal(s) is/are outputted to the controller on the basis of the result of the detection. In the arrangement, the camera can be constructed so that: when the access of the user's eye(s) to the viewfinder window 14 is detected by the detector, the controller controls the drive of the actuator so as to move at least one reflection mirror to its reflection position. Due to this control, when the user tries peeping into the viewfinder, it is automatically switched into the state of the viewfinder display.

Also, as a modification, the camera can be constructed so that the brightness of the surrounding can be measured on the basis of the output from the CCD 32 for example, and so that the position of the display device can be switched in compliance with the brightness thereof thus measured. According to the modification, when the brightness thereof is high, the display device can be retreated inside the camera body, thus allowing the user to observe it easily.

By the way, the range within which the LCD unit (or the display device) is tilted or inclined, is preferably 30° to 60°, and more preferably the angle at which the LCD unit is tilted or inclined is approximately 45°. In a case that the range is less than 30°, the image magnification may become too large, or the optical path length may not be absorbed inside the camera body when the image magnification is suitable, thus leading to a construction in which the viewfinder window is projected. Meanwhile, in a case that the range is greater than 60°, the optical path length may be too great, thus leading to the image magnification being too small. Meanwhile, in a case that the angle at which the LCD unit (or the display device) is tilted, is approximately 45° (generally, between 40° to 50°), the arrangement of the optical path or the arrangement of the viewfinder window, and the image magnification, can be determined with a good balance.

Such changes and modifications are to be understood as included within the scope of the present invention as defined by the appended claims unless they depart therefrom.

What is claimed is:

1. A camera comprising:
   a camera body having a viewfinder window;
   a display device positioned within the camera body and having an image plane which can be observed from outside of the camera body;
   at least one reflection mirror which is provided inside the camera body;
   a reflection mirror movement member which moves the at least one reflection mirror between a reflection position at which the at least one reflection mirror reflects a beam of light from the image plane towards the viewfinder window and a non-reflection position which is different from the reflection position;
   a display device movement member for moving the display device to a position corresponding to a position of the reflection mirror;
   an operation part, which has an operation member, for outputting an instruction signal on a basis of operation of the operation member;
   an actuator for driving the reflection mirror movement member and the display device movement member; and
   a controller for actuating the actuator on a basis of the instruction signal so that a position of the at least one reflection mirror and the display device are switched between the reflection position and the non-reflection position.

2. The camera as claimed in claim 1, wherein the display device is fixed relative to the camera body.

3. The camera as claimed in claim 1, in which the camera body has a monitor display window,
   wherein the display device can be moved by the display device movement member between a first position at which the display device is adjacent to the monitor display window and a second position at which the display device is retreated inside the camera body relative to the first position, and
   wherein the image plane of the display device opposes the monitor display window when the display device is positioned within at least a section of a total section between the first position and the second position.

4. The camera as claimed in claim 1, in which the camera body has a monitor display window,
   wherein the at least one reflection mirror is adjacent to the monitor display window at the reflection position.

5. The camera as claimed in claim 1, in which the camera body has a monitor display window,
   wherein one of the at least one reflection mirror and a support member for supporting the at least one reflection mirror has an indication which is on a plane opposing the monitor display window and which is visible through the monitor display window, when the at least one reflection mirror is moved to the reflection position.

6. The camera as claimed in claim 1, which further comprises a detector for detecting whether any object is presently adjacent to the viewfinder window and for outputting the instruction signal to the controller on a basis of a result of its detection,
   wherein the controller controls the actuator so as to move the at least one reflection mirror to the reflection position, when the detector detects that the any object is presently adjacent to the viewfinder window.

7. The camera as claimed in claim 1, wherein an angular difference between an angle at which the at least one reflection mirror is positioned at the reflection position and an angle at which the at least one reflection mirror is positioned at the non-reflection position, is between 30° and 60°.

8. The camera as claimed in claim 1, wherein the at least one reflection mirror is a half mirror.

9. The camera as claimed in claim 3, which further comprises an operation member,
   wherein the display device is positioned within the at least a section of the total section therebetween in compliance with operation of the operation member.

10. The camera as claimed in claim 3, which further comprises a transparent member for covering the monitor display window.

11. The camera as claimed in claim 3, which further comprises a photometric measurer for measuring brightness of a surrounding,
    wherein position of the display device is switched between the first position and the second position in compliance with the brightness thus having been measured by the photometric measurer.

12. The camera as claimed in claim 1, in which the display device is of a type of reflection,
    wherein there is further provided an illuminator inside the camera body, in which the illuminator illuminates the image plane of the display device when the at least one reflection mirror is at the reflection position.

13. The camera as claimed in claim 1, in which the display device has a backlight and is of a type of transmission, wherein the backlight changes brightness, when the at least one reflection mirror moves between the reflection position and the non-reflection position.

14. The camera as claimed in claim 13, in which the brightness of the backlight is relatively low when the at least one reflection mirror is at the reflection position, and the brightness of the backlight is relatively high when the at least one reflection mirror is at the non-reflection position.

15. The camera as claimed in claim 1, in which when the at least one reflection mirror is moved to the non-reflection position, one of the at least one reflection mirror and a support member for supporting the at least one reflection mirror blocks light which enters inside of the camera body from the viewfinder window.

16. The camera as claimed in claim 1, in which the image plane of the display device tilts relative to an optical axis connecting the image plane and the viewfinder window to each other, wherein the reflection mirror includes a bent mirror, which has a shape bent in one direction only.

17. A camera comprising:
a monitor display window;
a reflection member which is movable between a first position and a second position;
a display member positioned within the camera and having an image plane which can be observed from outside of the camera, the display member being movable between a first position at which the display member is adjacent to the monitor display window and a second position at which the display member is retreated inside the camera relative to the first position; and
a control member which controls a position of each of the reflection member and the display member, and which switches a display mode between a first display mode and a second display mode, wherein
an image plane of the display member is positioned immediately opposed to the monitor display window in the first display mode and the image plane of the display member is removed from a position immediately opposed to the monitor display window in the second mode.

* * * * *